United States Patent
Zhou et al.

(10) Patent No.: US 11,655,379 B2
(45) Date of Patent: May 23, 2023

(54) COMPOSITE CONDUCTIVE POLYMERS, PREPARATION METHOD AND APPLICATION THEREOF

(71) Applicant: UNIVERSITY OF ELECTRONIC SCIENCE AND TECHNOLOGY OF CHINA, Sichuan (CN)

(72) Inventors: Guoyun Zhou, Sichuan (CN); Yan Hong, Sichuan (CN); Jiujuan Li, Sichuan (CN); Wei He, Sichuan (CN); Yuanming Chen, Sichuan (CN); Shouxu Wang, Sichuan (CN); Dainan Zhang, Sichuan (CN); Chong Wang, Sichuan (CN)

(73) Assignee: UNIVERSITY OF ELECTRONIC SCIENCE AND TECHNOLOGY OF CHINA, Sichuan (CN)

( * ) Notice: Subject to any disclaimer, the term of this patent is extended or adjusted under 35 U.S.C. 154(b) by 166 days.

(21) Appl. No.: 17/182,814

(22) Filed: Feb. 23, 2021

(65) Prior Publication Data

US 2021/0179866 A1 Jun. 17, 2021

Related U.S. Application Data

(63) Continuation of application No. 16/245,098, filed on Jan. 10, 2019.

(30) Foreign Application Priority Data

Oct. 24, 2018 (CN) .......................... 201811244146.5

(51) Int. Cl.
| | |
|---|---|
| *C09D 5/24* | (2006.01) |
| *C09D 165/00* | (2006.01) |
| *C25D 3/38* | (2006.01) |
| *C25D 21/10* | (2006.01) |
| *C25D 5/56* | (2006.01) |
| *C08G 73/02* | (2006.01) |
| *C08K 3/08* | (2006.01) |

(52) U.S. Cl.
CPC .......... *C09D 5/24* (2013.01); *C08G 73/0266* (2013.01); *C09D 165/00* (2013.01); *C25D 3/38* (2013.01); *C25D 5/56* (2013.01); *C25D 21/10* (2013.01); *C08K 2003/085* (2013.01); *C08K 2003/0806* (2013.01); *C08K 2201/001* (2013.01)

(58) Field of Classification Search
CPC ...... C25D 5/56; C25D 15/00; C08G 73/0266; C08G 73/0605; C08G 73/0611; C08G 61/12; C08G 61/122; C08G 61/123; C08G 61/126; C08K 3/08; C09D 165/00
See application file for complete search history.

(56) References Cited

U.S. PATENT DOCUMENTS

| | | | |
|---|---|---|---|
| 10,421,873 B2 * | 9/2019 | Li ........................... C08J 7/0427 |
| 2004/0072987 A1 | 4/2004 | Groenendaal et al. | |
| 2004/0112755 A1 | 6/2004 | Czeczka et al. | |
| 2006/0199900 A1 | 9/2006 | Matsumoto et al. | |
| 2014/0021400 A1 | 1/2014 | Coenjarts | |
| 2014/0138253 A1 | 5/2014 | Rasmussen et al. | |
| 2014/0162061 A1 | 6/2014 | Kawakita et al. | |

FOREIGN PATENT DOCUMENTS

| | | | | |
|---|---|---|---|---|
| CN | 104861189 A | | 8/2015 | |
| CN | 109485833 A | | 3/2019 | |
| EP | 1897974 A1 | * | 3/2008 | ............... C25D 3/38 |
| WO | 9326012 A1 | | 12/1993 | |
| WO | 2012170643 A1 | | 12/2012 | |
| WO | 2014101193 A1 | | 7/2014 | |

OTHER PUBLICATIONS

Cho, M.S. et al.; Preparation of PEDOT/Cu composite film by in situ redox reaction between EDOT and copper(II) chloride. Synthetic Materials, 158, 2008, pp. 865-869.
Bober, Patrucja et al.; Polyaniline-silver composites prepared by the oxidation of aniline with mixed oxidants, silver nitrate and ammonium peroxydisulfate: The control of silver content. Polymer, 52, 2011, pp. 5947-5952.
Blinova, Natalia V. et al.; The oxidation of aniline with silver nitrate to polyaniline-silver composites. Polymer, 50(1), 2009, pp. 50-56, particularly p. 50).
Bober, Patrucja et al.; In-situ prepared polyaniline-silver composites: Single- and two-step strategies. Electrochimica Acta, 122, 2014, pp. 259-266.
Google patents translation of CN 109485833 (Mar. 2019, 5 pages).
Translation of WO 9326012 (1993, 9 pages).
Translation of CN 104861189 (2015, 8 pages).

* cited by examiner

*Primary Examiner* — Brieann R Johnston
(74) *Attorney, Agent, or Firm* — Novick, Kim & Lee, PLLC; Allen Xue

(57) ABSTRACT

A composite conductive polymer, a preparation method thereof and application thereof are disclosed, wherein a mixed solution A is used in the preparation process of the composite conductive polymer, which comprises the following two components: (i) a strong oxidant selected from at least one of permanganate, persulfate, dichromate and perchlorate; (ii) an oxidizing agent containing a metal ion capable of being reduced to elementary substance. The preparation process is simple and easy to operate, with low cost and favorable environmental protection and the obtained composite conductive polymer containing metal in elementary form, has good film-forming property and the film thereof can completely cover the surface of the insulating substrate, with excellent electrical conductivity, which therefore can be widely used in electroplating materials and semiconductor materials and other fields.

9 Claims, 2 Drawing Sheets

COMPOSITE CONDUCTIVE POLYMERS, PREPARATION METHOD AND APPLICATION THEREOF

RELATED APPLICATION

The present application is a continuation application of U.S. Ser. No. 16/245,098, filed Jan. 10, 2019, which claims the priority of the Chinese Patent Application No. 201811244146.5, filed on Oct. 24, 2018, which is incorporated herein by reference as part of the disclosure of the present application.

TECHNICAL FIELD

Embodiments of the present disclosure relate to a composite conductive polymer containing metal, a preparation method and applications thereof.

BACKGROUND

Conductive polymers can be classified into composite conductive polymers and structural conductive polymers, according to the structure, composition and preparation method. The composite conductive polymer is a multi-phase polymer composite material with conductive properties prepared by using a polymer structural material as a matrix, which is incorporated with conductive fillers such as carbon powder and metal powder, and employing techniques such as dispersion, layering and surface recombination. The composite conductive polymers, with advantages of simple process, low price and good practicality, easy to be commercially produced, is more developed than structural conductive polymers.

At present, common synthesis methods of the composite conductive polymers membranes mainly include electrochemical polymerization and chemical polymerization. The composite conductive polymers can be formed on the conductive substrates by electrochemical polymerization, and the thickness of the resulting film can be controlled by adjusting the current and voltage. The electrochemical polymerization processes are complicated, costly, restricted by demand for conductive substrates and difficult to be applicable in large scale production, while preparation of composite conductive polymers by chemical polymerization has the advantages of simple preparation process, low cost and mass production. However, the following problems often emerge in the process of preparing the composite conductive polymers by chemical polymerization: 1. it is difficult to avoid the use of toxic solvents such as chloroform, toluene, tetrahydrofuran during synthesis process; 2. an oxidant with a single component is used in the synthesis process, resulting in long polymerization time, generally more than 20 h; 3. the doping processes of some composite conductors in which the dopants exist in the form of ions are complicated and cumbersome to manipulate; 4. most of the composite conductive polymers which are prepared by chemical polymerization methods are solid powder and difficult to form film, thus greatly limiting the application field of the product.

SUMMARY

Embodiments of the present disclosure provide a composite conductive polymer comprising an elementary metal and a polymer, and materials for synthesizing the composite conductive polymer comprise a mixed solution A and a monomer-containing solution for polymerization.

According to an embodiment of the present disclosure, in the composite conductive polymer, the elementary metal is, for example, at least one selected from the group consisting of Cu, Pd, Ag, Pt and Au, and for example, the elementary metal is selected from Cu, Ag.

The monomer for synthesizing the polymer is at least one selected from the group consisting of pyrrole, aniline, thiophene and derivatives thereof, for example, the monomer is thiophene or derivatives thereof; and the derivatives of thiophene is, for example, a thiophene substituted by a $C_1$-$C_{10}$ alkyl group and/or $C_1$-$C_{10}$ alkoxy group.

The mixed solution A comprises the following two components:

(i) a strong oxidant selected from at least one of permanganate, persulfate, dichromate and perchlorate; wherein, the permanganate, persulphate, dichromate or perchlorate is, for example, a potassium salt or a sodium salt.

(ii) an oxidizing agent containing a metal ion capable of being reduced to elementary substance; the oxidizing agent containing the metal ion capable of being reduced to elementary substance is at least one selected from the group consisting of Cu salt, Pd salt, Ag salt, Pt salt and Au salt, and for example, the oxidizing agent is $Cu^{2+}$ salt or $Ag^+$ salt, such as $CuCl_2$ or $AgNO_3$.

The mixed solution A may further comprise an acid as component (iii). The acid is, for example, at least one selected from the group consisting of boric acid, phosphoric acid, carboxyl group-containing organic acid, sulfonic acid group-containing (—$SO_3H$) organic acid, sulfinic acid group-containing organic acid, and organic acid containing sulphur carboxylic acid group (RCOSH), such as boric acid.

A concentration of the component (i) in the mixed solution A is from 0.2 wt % to 1 wt %, for example, from 0.4 wt % to 0.6 wt %, and for another example, 0.5 wt %; a concentration of the component (ii) in the mixed solution A is, for example, from 0.05 mol/L to 2.00 mol/L, for example, from 0.10 mol/L to 1.5 mol/L, and for another example, from 0.15 mol/L to 1.0 mol/L; and a concentration of the component (iii) in the mixed solution A is, for example, from 5 g/L to 15 g/L, for example, from 8 g/L to 12 g/L, and for another example, 10 g/L.

In the monomer-containing solution for polymerization, a concentration of the monomer is, for example, from 10 mL/L to 30 mL/L, for example, 20 mL/L; for example, a pH of the monomer-containing solution can be further adjusted to 1.8 to 2.2 by using a pH-adjusting acid. For example, the pH is adjusted to 2. The pH-adjusting acid may be selected from the group consisting of phosphoric acid and boric acid. For example, the pH-adjusting acid is phosphoric acid. A concentration of the pH-adjusting acid is, for example, from 1 mL/L to 5 mL/L.

Embodiments of the present disclosure further provide a film comprising the above composite conductive polymer. The square resistance of the film is from 500Ω/Y to 3×10³Ω/Y; A metal content of the film is from 1.00 wt % to 5.00 wt %, for example, from 1.50 wt % to 4.50 wt %, and for example, 2.00±0.50 wt %, 3.00±0.50 wt %, or 4.00±0.50 wt %.

An embodiment of the present disclosure further provides a mixed solution A. The mixed solution A is as defined above.

An embodiment of the present disclosure further provides use of the mixed solution A for preparing a metal-containing composite conductive polymer and a film thereof. The metal-containing composite conductive polymer is the composite conductive polymer as defined above, and the metal-containing composite conductive polymer film is the film of the composite conductive polymer as defined above.

In another aspect, an embodiment of the present disclosure provides a method for preparing a composite conductive polymer, which comprises:

(a) providing the above mixed solution A and placing an insulating substrate in the mixed solution A;

(b) placing the obtained insulating substrate in a monomer-containing solution and performing polymerization of the monomer.

According to an embodiment of the present disclosure, the method comprises the steps of:

(a) placing the insulating substrate in the mixed solution A to form an oxide layer on the insulating substrate, washing and drying the insulating substrate;

(b) placing the obtained insulating substrate in the monomer-containing solution and performing polymerization of the monomer, to form metal-containing composite conductive polymer on the insulating substrate, washing and drying the insulating substrate.

According to an embodiment of the present disclosure, in the composite conductive polymer, the metal exists in elementary form, for example, the metal is at least one selected from the group consisting of Cu, Pd, Ag, Pt and Au, for example, the elementary metal is selected from Cu, Ag.

The insulating substrate is selected from an insulating material such as resin, rubber, glass, polyimide (PI) or polyethylene terephthalate (PET). The monomer is, for example, at least one selected from the group consisting of pyrrole, aniline, thiophene and derivatives thereof, for example, the monomer is thiophene or derivatives thereof; and the derivatives of thiophene are, for example, thiophene substituted by a $C_1$-$C_{10}$ alkyl group and/or $C_1$-$C_{10}$ alkoxy group.

According to an embodiment of the present disclosure, the mixed solution A comprises the following two components:

(i) a strong oxidant selected from at least one of permanganate, persulfate, dichromate and perchlorate; (ii) an oxidizing agent containing a metal ion capable of being reduced to elementary substance; wherein, the permanganate, the persulphate, the dichromate or the perchlorate is, for example, a potassium salt or a sodium salt. The oxidizing agent containing a metal ion capable of being reduced to elementary substance is at least one selected from the group consisting of Cu salt, Pd salt, Ag salt, Pt salt and Au salt, and for example, the oxidizing agent is $Cu^{2+}$ salt or $Ag^+$ salt, such as $CuCl_2$, or $AgNO_3$. The mixed solution A may further comprise an acid as component (iii).

A concentration of the component (i) in the mixed solution A is from 0.2 wt % to 1 wt %, for example, from 0.4 wt % to 0.6 wt %, and for another example, 0.5 wt %; a concentration of the component (ii) in the mixed solution A is, for example, from 0.05 mol/L to 2.00 mol/L, for example, from 0.10 mol/L to 1.5 mol/L, and for another example, from 0.15 mol/L to 1.0 mol/L. For example, the concentration of the component (ii) can be 0.30 mol/L, 0.4 mol/L, 0.5 mol/L, 0.6 mol/L or 0.70 mol/L; and a concentration of the component (iii) in the mixed solution A is, for example, from 5 g/L to 15 g/L, for example, from 8 g/L to 12 g/L, and for another example, 10 g/L.

According to an embodiment of the present disclosure, in the step (a), a temperature under which the insulating substrate is placed in the mixed solution A is from 60° C. to 130° C. For example, the temperature is from 80° C. to 110° C., from 85° C. to 95° C., and 90° C.; and a time for placing is, for example, 5 min-20 min, for example 6 min-15 min, and for example 10 min. In the step (a), the insulating substrate is placed in the mixed solution A to form an oxide layer.

According to an embodiment of the present disclosure, in the step (b), a concentration of the thiophene monomer is from 10 mL/L to 30 mL/L, for example, 20 mL/L, a temperature for polymerization of the monomer is from 15° C. to 45° C., for example at room temperature, and a time for polymerization of the monomer is from 2 h to 8 h, for example from 3 h to 6 h, for example 4 h. Further, a small amount of pH-adjusting acid is added to adjust a pH of the solution for polymerization. The pH-adjusting acid is, for example, selected from phosphoric acid and boric acid. For example, the acid is phosphoric acid with a concentration from 1 mL/L to 5 mL/L.

According to an embodiment of the present disclosure, the method further comprises a pretreatment step (step before the step (a)): degreasing, washing the insulating substrate followed by plasma processing. In the degreasing step, the degreasing liquid used is at least one selected from the group consisting of an alkaline agent, a surfactant, and a phosphate. For example, the degreasing liquid is a mixture of sodium hydroxide, sodium dodecylbenzenesulfonate, sodium carbonate, and trisodium phosphate. A ratio of the above components in the mixture is, for example, 15-25 g/L: 0.5-2 g/L: 1-5 g/L: 3-7 g/L; for example 20 g/L: 1 g/L: 3 g/L: 5 g/L; for example, the degreasing process is carried out at 40° C.-80° C. (for example, 40° C.-60° C.) for 3 min-30 min (for example, 3 min-10 min) followed by washing and drying. The plasma process is carried out under atmospheric pressure of 70 pa-120 pa and with a frequency of 80 w-100 w. For example, the pressure is 90 pa, and the frequency is 90 w.

An embodiment of the present disclosure further provides a composite conductive polymer obtained by the above preparation methods, comprising an elementary metal. An embodiment of the present disclosure further provides use of the metal-containing composite conductive polymer in electroplating.

In another aspect, an embodiment of the present disclosure provides a method for electroplating, which comprises: electroplating a substrate covered with the composite conductive polymer.

According to an embodiment of the present disclosure, the electroplating method comprises: placing a substrate covered with the composite conductive polymer in a plating solution, applying electric current, electroplating with air agitation at room temperature, and then washing and drying.

The plating solution comprises copper sulfate pentahydrate, concentrated sulfuric acid and chloride ion, and a concentration of the copper sulfate pentahydrate in the plating solution is from 80 g/L to 120 g/L, for example, from 90 g/L to 110 g/L, and for example, 100 g/L; a concentration of concentrated sulfuric acid in the plating solution is from 80 mL/L to 120 mL/L, for example, from 90 mL/L to 110 mL/L, for example, 100 mL/L.

A density of the applied current is from 2 $A/dm^2$ to 3 $A/dm^2$, for example 2.5 $A/dm^2$; and time for electroplating with air inflation is, for example, 20 min-50 min, for example 25 min-35 min, for example 30 min.

The beneficial effects of the disclosure are as follows:

1. The composite conductive polymer synthesized by embodiments of the present disclosure, containing elementary metal, has good film-forming property and the film obtained can completely cover the surface of the insulating substrate, with a square resistance from 500Ω/Y to $3\times10^3\Omega/Y$ and excellent electrical conductivity, which therefore can be widely used in electroplating materials and semiconductor materials and other fields.

2. The mixed solution A employed in embodiments of the present disclosure contributes to synchronization of polymerization and metal element formation, and enables short time to produce a composite conductive polymer.

3. The preparation process of embodiments of the present disclosure enables a composite conductive polymer film to grow on all kinds of insulating materials.

4. The preparation process of the composite conductive polymer according to embodiments of the present disclosure is simple and easy to operate, with low cost, during which, the solution employed in the polymerization reaction, without any toxic organic solvent, can be reused, thus is environment-friendly synthesis process for materials.

DETAILED DESCRIPTION

The preparation method of the present invention will be further described in detail below with reference to specific examples. It is understood that the following examples are merely illustrative of the invention and are not to be construed as limiting the scope of the invention. The technology implemented based on the above description of the present invention is intended to be within the scope of the present invention. The experimental methods used in the following examples are all conventional methods unless otherwise specified; The reagents, materials and the like used in the following examples are commercially available unless otherwise specified.

EXAMPLE 1

Preparation of Composite Conductive Polymer

Figure 1:
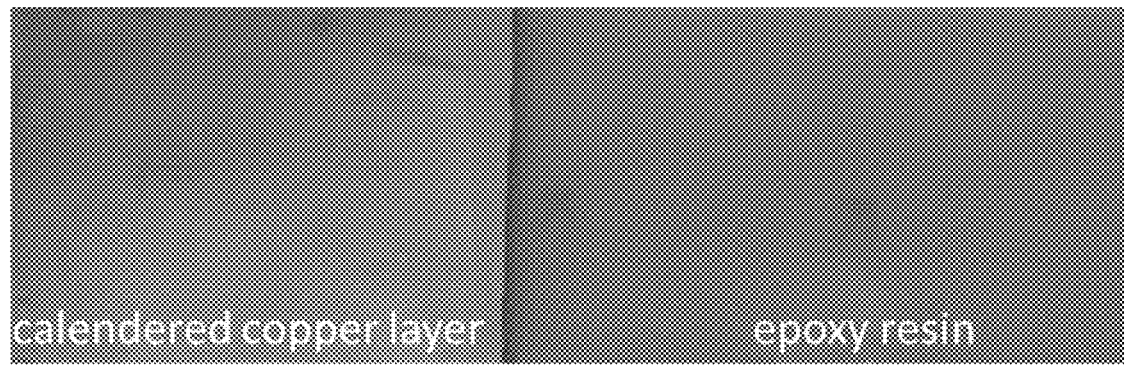
FIG. 1 is a physical view of an original insulating substrate.

An insulating substrate (epoxy resin substrate, as shown in FIG. 1), after reacting with a degreasing solution (a mixture of 20 g/L sodium hydroxide, 1 g/L sodium dodecylbenzene sulfonate, 3 g/L sodium carbonate and 5 g/L of trisodium phosphate) at 50° C. for 5 minutes, was washed and dried. Then, the degreased insulating substrate was subjected to air plasma treatment at room temperature for 5 minutes, under a pressure of 90 Pa, and a frequency of 90 W. Subsequently, the treated insulating substrate was immersed in a mixture of 0.5 wt % potassium permanganate, 0.1 mol/L $CuCl_2 \cdot 2H_2O$ and 10 g/L boric acid at 90° C. for 10 min to form an oxide layer on the insulating substrate, which was then washed and dried. After that, the insulating substrate was immersed in a solution containing 20 mL/L of thiophene monomer for polymerization at room temperature (the solution for polymerization was purchased from Guangdong Guanghua Technology Co., Ltd., code 2303), added with 3 mL/L of phosphoric acid to adjust the pH value of the solution for polymerization, followed by reacting for 4 hours to obtain a copper-containing conductive polythiophene on the insulating substrate, and then washed and naturally dried.

Figure 2:
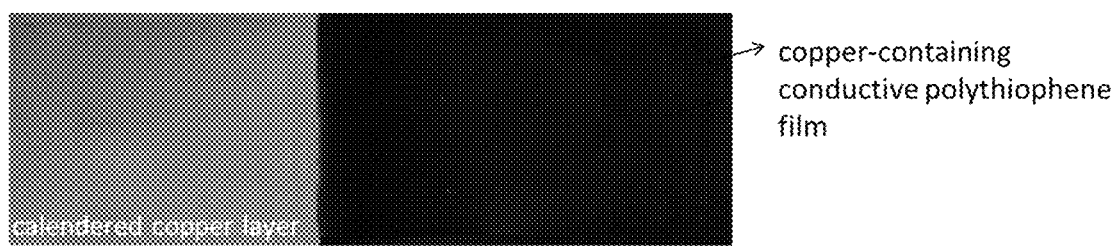
FIG. 2 is a physical view of the sample of FIG. 1 covered by a copper-containing conductive polythiophene, following the proceedings of example 1.
Figure 3:
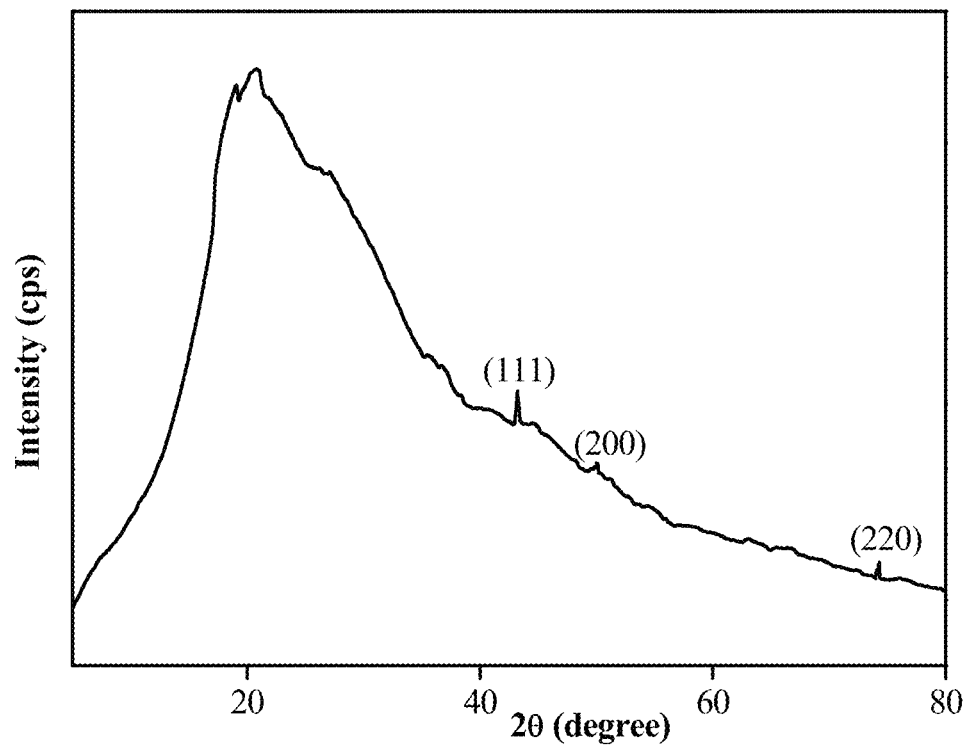
FIG. 3 is an XRD pattern of the sample of FIG. 2.

The copper-containing conductive polythiophene obtained by the polymerization of example 1 is shown in FIG. 2. By comparing FIG. 1 and FIG. 2, it can be seen that the copper-containing polythiophene film prepared by the embodiment of the present disclosure has good coverage property. Information about the crystal face of the elementary copper contained in the product is detected by XRD, which shows a face-centered cubic structure (see FIG. 3).

The obtained copper-containing polythiophene film was subjected to a four-probe detector to measure the square resistance to characterize its electrical conductivity, and the measured square resistance is $1.83\times10^3\Omega/Y$. In addition to this, a content of copper in the copper-containing polythiophene film was measured by XPS to be 1.68 wt %.

EXAMPLE 2

Preparation of the Substrate Plated with Copper

Figure 4:
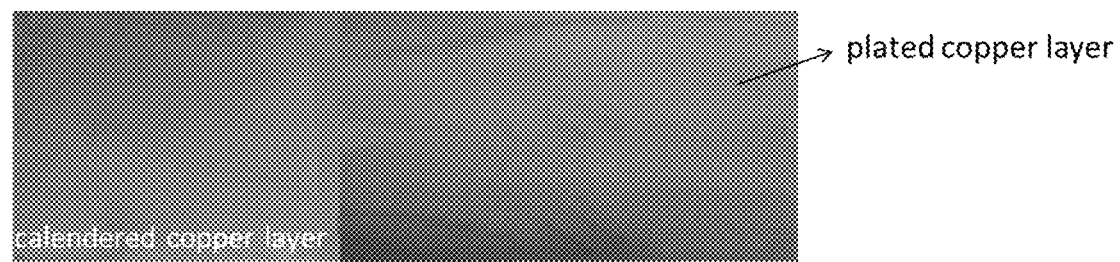
FIG. 4 is a physical view of the sample of FIG. 2 plated with copper.

A substrate grown with a copper-containing conductive polythiophene was immersed in a plating solution comprising 100 g/L of copper sulfate pentahydrate, 100 mL/L of concentrated sulfuric acid, and 60 mg/L of chloride ion, applied a current of 2.5 A/dm$^2$, plated with air agitation for 30 minutes at room temperature, and taken out for washing and drying. The copper conductive layer was evenly covered on the substrate, which was as shown in FIG. 4, and it can be seen that the copper-containing conductive polythiophene film prepared by the present embodiment has excellent properties suitable for electroplating application.

EXAMPLE 3

Preparation of Composite Conductive Polymer

The composite conductive polymer was prepared referring to example 1, under the same conditions as example 1 except that the concentration of $CuCl_2 \cdot 2H_2O$ was changed to 0.5 mol/L. Finally, a copper-containing conductive polythiophene film on the surface of the substrate was obtained.

The square resistance of the film is $590\Omega/Y$ and the copper content of the film is 3.57 wt %.

EXAMPLE 4

Preparation of Composite Conductive Polymer

The composite conductive polymer was prepared referring to example 1, under the same conditions as example 1 except that 0.1 mol/L $AgNO_3$ was used instead of $CuCl_2 \cdot 2H_2O$. Finally, a silver-containing conductive polythiophene film on the surface of the substrate was obtained.

The square resistance of the film is $1.36\times10^3\Omega/Y$ and the copper content of the film is 2.02 wt %.

The embodiments of the present disclosure have been described above. However, the present invention is not limited to the above embodiments. Any modifications, equivalent substitutions, improvements, etc., made within the spirit and scope of the invention are intended to be included within the scope of the present invention.

We claim:

1. A method for preparing a substrate, comprising:
   (a) oxidizing an insulating substrate in a mixed solution to form an oxide layer on a surface of the insulating substrate, wherein the mixed solution comprises an oxidant selected from the group consisting of permanganate, persulfate, dichromate, perchlorate, and a mixture thereof, and an oxidizing agent selected from the group consisting of Cu salt, Pd salt, Ag salt, Pt salt, or Au salt having a metal ion capable of being reduced to Cu, Pd, Ag, Pt, or Au;

(b) applying on the oxidized insulating substrate a solution comprising a monomer; and (c) polymerizing the monomer to form a composite conductive polymer on the surface of the insulating substate, wherein the composite conductive polymer comprises one or more metal selected from the group consisting of Cu, Pd, Ag, Pt, Au, and mixtures thereof.

2. The method according to claim 1, wherein the monomer is at least one selected from the group consisting of pyrrole, aniline, thiophene and derivatives thereof; and the derivatives of thiophene is thiophene substituted by a $C_1$-$C_{10}$ alkyl group and/or $C_1$-$C_{10}$ alkoxy group.

3. The method according to claim 1, wherein a concentration of the monomer in the solution is from 10 mL/L to 30 mL/L.

4. The method according to claim 1, further comprising adjusting a pH of the solution to 1.8 to 2.2 using phosphoric acid or boric acid.

5. The method according to claim 1, wherein step (a) is carried out at a temperature of 60° C. to 130° C. for 5-20 min, wherein, in step (b), the solution contains a thiophene monomer having a concentration of 10 mL/L to 30 mL/L, and wherein, in step (c), the polymerization is carried out at a temperature of 15° C. to 45° C. for a time duration of 2 h to 8 h.

6. The method according to claim 1, further comprising pretreating the insulating substrate by degreasing using a degreasing liquid, washing, and plasma cleaning, wherein the degreasing liquid is at least one selected from the group consisting of an alkaline agent, a surfactant, phosphate, and a mixture of sodium hydroxide, sodium dodecylbenzenesulfonate, sodium carbonate, and trisodium phosphate at a ratio of 15-25 g/L: 0.5-2 g/L: 1-5 g/L: 3-7 g/L, wherein degreasing is carried out at 40° C.-80° C. for 3-10 min, and wherein plasma cleaning is carried out under an atmospheric pressure of 70 Pa –120 Pa and with a frequency of 80 w-100 w.

7. The method according to claim 1, wherein the mixed solution comprises:

0.2 wt % to 1 wt % of potassium permanganate, sodium permanganate, or a mixture thereof;

0.05 mol/L to 2.00 mol/L of an oxidizing agent containing $Cu^{2+}$; and 5 g/L to 15 g/L of boric acid.

8. The method according to claim 1, wherein the composite conductive polymer comprises 1.00 wt %-5.00 wt % of elemental Cu.

9. A method for electroplating the substrate of claim 1, comprising:

placing the substrate in a plating solution, applying an electric current, electroplating with air agitation at room temperature, and then washing and drying, wherein the plating solution comprises copper sulfate pentahydrate, concentrated sulfuric acid and chloride ion, and a concentration of the copper sulfate pentahydrate in the plating solution is from 80 g/L to 120 g/L; a concentration of the concentrated sulfuric acid in the plating solution is from 80 mL/L to 120 mL/L; a density of the applied electric current is from 2 A/dm² to 3 A/dm²; and time for electroplating with air inflation is from 20 min to 50 min.

* * * * *